May 9, 1967 A. T. THOMAS 3,319,198

MINIATURE TELEPHONE INTERRUPTER SWITCH

Filed June 21, 1965

INVENTOR
ALLAN T. THOMAS
BY
ATTORNEY

United States Patent Office 3,319,198

Patented May 9, 1967

3,319,198

MINIATURE TELEPHONE INTERRUPTER SWITCH

Allan T. Thomas, Downsview, Ontario, Canada, assignor to Johnson Matthey and Mallory, Ltd., Toronto, Ontario, Canada, a corporation of Canada Filed June 21, 1965, Ser. No. 465,377
12 Claims. (Cl. 335—114)

The present invention relates to a novel control device, more particularly to a novel miniature telephone interrupter switch means. The miniature telephone interrupter switch means includes a means and method for sequentially engaging and disengaging a plurality of switches at predetermined intervals of time. It will be observed that the means and method of the present invention is cooperatively associated with electrical circuitry wherein it is necessary that sequential engaging and disengaging of a plurality of switches be repeated faithfully and accurately.

With the increased numbers of telephones, the electrical circuitry utilized with the telephones becomes more complex and therefore the need arises for a simple and accurate means of ascertaining the operational condition of a plurality of telephone circuits yet have the characteristic of being small and compact. Several presently available devices are used in conjunction with electrical circuitry, such as telephone circuitry, to periodically interrupt control signals in accordance with a timed function. The means and method of the present invention will periodically terminate a control signal associated with the telephone circuitry so that the condition of the telephone circuitry may be quickly and conveniently ascertained. Any of several different types of indicating means can be used to visually or audibly indicate the condition of any one of or a plurality of telephone circuits.

By the accompanying drawings and specifications, the novel means and method whereby the present invention fulfills the required purpose will be disclosed.

Therefore, it is an object of the present invention to provide a miniature telephone interrupter switch means that includes a plurality of follower arms that are aligned on a moulded cam means.

A further object of the present invention is to provide a miniature telephone interrupter switch means that includes a moulded cam means that has a surface including adjacent tracks having lead and lag fall contours.

Still another object of the present invention is to provide a miniature telephone interrupter switch means that includes a follower arm a U-shaped extremity that is adjustable on the cooperatively associated surface of a cam means and that is fixedly coupled to a terminal block means.

Another object of the present invention is to provide a follower arm that skids or slides over the rise and fall contours of a cooperatively associated cam means.

Yet another object of the present invention is to provide a miniature telephone interrupter switch means that requires a relatively small torque to operate.

Still another object of the present invention is to provide a miniature telephone interrupter switch means including a mouled cam means having adjacent circumferential tracks having lead and lag fall and rise contours so as to actuate a follower switch to one of a plurality of positions.

A further object of the present invention is to provide a miniature telephone interrupter switch means that is simple, efficient, effective and accurate.

Another object of the present invention is to provide a miniature telephone interrupter switch means that includes a plurality of follower switches that are gold flashed to provide a better conductive path for electrical current flowing therethrough, and to protect the beryllium copper follower switches from corrosion or discolorment.

Yet still another object of the present invention is to provide a miniature telephone interrupter switch means that includes a means and method whereby the interrupter switch means is substantially dust free.

The present invention in another of its aspects relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Objects will appear in the following description, appended claims, and appended drawings. The invention resides in the novel construction, combination, arrangement, and cooperation of elements as hereinafter described and more particularly as defined in the appended claims.

The appended drawing illustrates the preferred embodiment of the present invention constructed to function in the most advantageous modes devised for the practical application of the basic principles involved in the hereinafter described invention.

Figure 1:
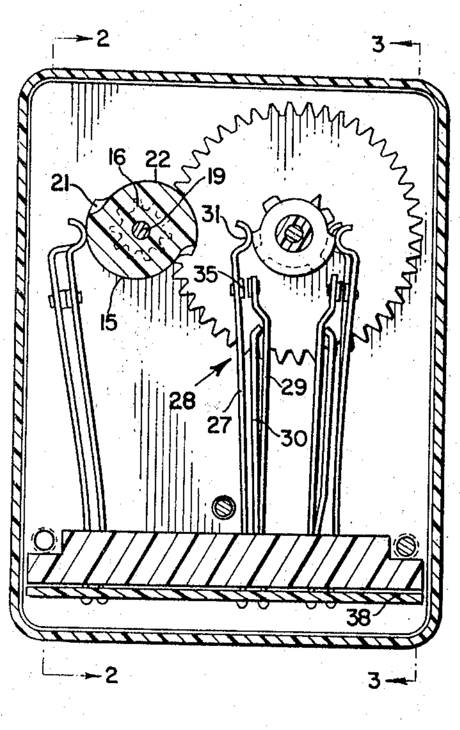
FIGURE 1 is a cross sectional top view of the miniature telephone interrupter switch means taken across the lines 1—1 of FIGURE 2 illustrating the lead and lag tracks of a cam means and the aligned follower arms of the plurality of follower switch means.

Generally speaking, the means and methods of the present invention relate to an interrupter switch means including a cam means that is driven at a constant rate of speed. The cam means includes circumferential tracks that have rise and fall contours. A follower switch means rides on adjacent tracks of the cam means. The follower switch includes a first contact carrying follower arm having an extremity skidding or sliding on one of the tracks that has lead fall contours, and a second contact carrying follower arm skidding or sliding on an adjacent track that includes lag fall contours. The contact of the second contact carrying follower arm is overlying the contact of the first contact carrying follower arm. The contacts of the two aforementioned follower arms are in a normally engaged position. As the first follower arm skids or slides down the cooperatively associated lead fall contour, the contact of the first follower arm disengages the contact of the second follower arm. After a lapse of a predetermined interval of time, the second follower arm skids or slides down the cooperatively associated lag fall contour of the adjacent track to engage the contacts of the first follower arm.

More particularly, the present invention relates to a miniature telephone interrupter switch means that includes a drive means having a constant rotary motion output. A first or non-circular cam means is coupled to and rotatably driven by the drive means. The non-circular cam means includes a plurality of circumferential tracks in spaced, parallel relationship. The tracks include a plurality of rise and fall contours. The rise contours have an arc-shaped outline of a relatively large diameter whereas the fall contours have an arc-shaped outline of a relatively small diameter. A second cam means is coupled to and driven by the non-circular cam means. The second cam means includes a plurality of circumferential tracks in spaced, parallel relationship. The circumferential tracks of the second cam means include rise and fall contours. A first gold-flashed follower switch rides on adjacent tracks of the non-circular cam means. The follower switch includes a first contact carrying follower arm having an adjustable, U-shaped extremity that skids or slides on one of the tracks that has a plurality of lead fall contours. A second contact carrying follower arm of the follower switch includes an adjustable U-shaped extremity that skids or slides on an adjacent track, the adjacent track includes lag fall contours. The U-shaped extremities of both of the follower arms are aligned on the non-circular cam means. The contact of the second contact carrying follower arm is overlying the contact of the first contact carrying follower arm. The contacts of these two contact carrying follower arms are normally in an engaged position. As the first follower arm skids or slides down the cooperatively associated lead fall contour, disengagement takes place between the aforementioned contacts. Shortly thereafter, the second follower arm skids or slides down the cooperatively associated lag fall contour to engage the normally engaged contacts. A second gold-flashed follower switch is skidding or sliding on the rise and fall contours of the second cam means. The second follower switch includes a contact carrying follower arm that has an adjustable U-shaped extremity and a contact carrying blade. The adjustable U-shaped extremity of the follower arm skids or slides on the contours of the track of the second cam means. The follower arm is biased into engagement with or disengagement with the contact carrying blade in accordance with the contours of the track.

Referring now to the drawings, which illustrate the preferred embodiment of the present invention, it is seen that the miniature telephone interrupter switch means is generally indicated by numeral 10. One of the components of the miniature telephone interrupter switch means is a prime mover means or drive means 11 which is mechanically coupled to pinion 12 by any suitable means. Pinion 12 is displaced in the counterclockwise direction with a substantially constant rotary motion by the action of the drive means. The drive means is fixedly coupled to first mounting plate 13 by a plurality of suitable retaining means (not shown) such as rivets, welds or the like. The retaining means substantially prevents deleterious horizontal or vertical displacement of the drive means due to vibration and/or abusive handling. In addition, the retaining means predeterminately locates the pinion with respect to a first speed reduction gear 14 such as the first speed reduction gear meshes with and is rotatably driven by the pinion 12 in the clockwise direction at a constant, but reduced speed. Fixedly coupled to the first speed reduction gear in axial relationship is moulded cam 15. Fixedly coupled to the other axial extremity of the moulded cam 15, is small gear 16. The first speed reduction gear, the moulded cam and the small gear may be formed in a substantially unitary piece, hereinafter referred to as first moulded cam means 17. The first moulded cam means may be fabricated from any suitable electrically non-conductive and durable material such as plastic or the like. The first moulded cam means is rotatably journalled between mounting plate 13 and end plate 18 by any suitable means such as a post means 19 interfitting with apertures in each of the plates. It is seen that the mounting plate and the end plate are in spaced, parallel relationship. The moulded cam 15 includes a plurality of circumferential tracks 20 that each include coded indicia contours or fall contours 21 and rise contours 22. It is seen that the rise contours are not abrupt but rather are gradual. The rise contours are gently inclining. The fall contour have an arc-shaped outline of relatively small diameter when compared to the rise contour. The rise contour has an arc-shaped outline of relatively large diameter when compared to the fall contour. The gradual outward or inward displacement of the follower arms due to the rise and fall contours of the cam means requires a minimum torque. The slow rise contour produces a slow rate of deflection of the follower arms, which in turn, requires a minimum torque. The frictional force remains almost constant because the follower arm displacement is not sufficient to change appreciably the force that the follower arm exerts on the cam. The friction generated by the sliding of the follower arms on the cam tracks is minimized as a result thereof. It will be noted that each circumferential track includes two rise contours and two fall contours in alternate relationship. The number of rise contours and the number of fall contours may be varied in accordance with the desired sequence of operations. It was found that two interruptions of the control signal per revolution of the first moulded cam means best fulfilled the present objectives of the present invention.

A second moulded cam means 23 is rotatably journalled between mounting plate 13 and end plate 18 in a manner substantially similar to that of the first moulded cam means. The second moulded cam means includes a second speed reduction gear 24, axially coupled to the second moulded cam 25. The second speed reduction gear 24 meshes with and is rotatably driven at a constant speed by small gear 16. The moulded cam 25 includes a plurality of circumferential tracks 26. The circumferential tracks 26 include a rise contour and a fall contour having an arc-shaped outline of a relatively small diameter. The circumferential tracks 26 include one rise contour and one fall contour that serve to bias a follower arm 27 of the follower switch 28 cooperatively associated therewith or riding thereon to a predetermined position. It is seen that each circumferential track contains rise and fall contours that determine the state of activation of the cooperatively associated follower arm skidding or sliding thereon. The follower arm is biased so as to be riding on the contour of the track at all times during the operation of the miniature telephone interrupter switch.

FIGURE 1 shows a perspective view of a follower switch means 28. The follower switch includes contact carrying follower arm 27 and a contact carrying blade 29 adjacent one side of the contact of the carrying follower arm. Assuming the follower switch is in the neutral or disengaged position, displacement of the follower arm toward the axial center of the moulded cams due to a fall contour causes the contact of the follower arm to engage the contact of the contact carrying blade 29. As the follower arm engages a rise contour and thereafter rises therealong, the follower arm is biased to a neutral or open position as illustrated in FIGURE 1. Further counterclockwise rotation of the second cam means causes the follower arm to engage the rise contour which biases the contact out of engagement with the contact of the contact carrying blade 29. It is emphasized that the sequence of operations of the follower switch of the present invention is merely descriptive and as such is intended to facilitate the description of the present invention. The sequence of operations of the follower switch is determined by the desired sequence of interruptions of the control signal associated with the particular follower switch.

FIGURE 1 shows that the contact of contact carrying blade 29 is retained at a predetermined position with respect to the contact of the follower arm when the follower arm is in the neutral position. Cooperatively associated with each contact carrying blade is a leaf spring 30. The leaf spring is utilized to bias the contact carrying blade to a predetermined position with respect to the follower arm.

Figure 4:
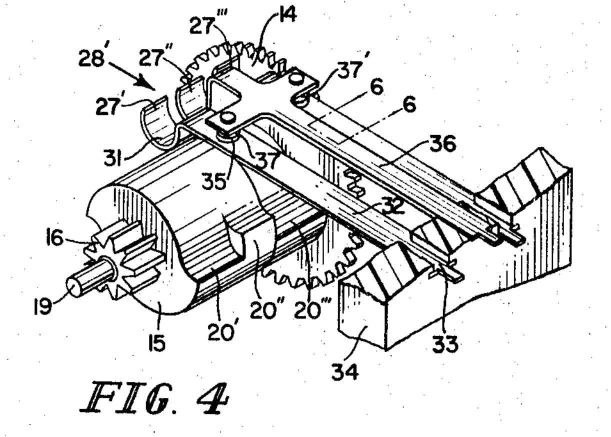
FIGURE 4 is a perspective view of the aligned followers riding on the lead and lag contours of the cam means and illustrates the means and method of fixedly coupling the follower arms to a terminal means.
Figure 6:
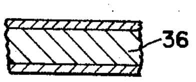
FIGURE 6 is a cross-sectional view taken across the lines 6—6 of FIGURES 4 illustrating the gold flash coating of the follower arm.

FIGURE 4 shows a follower switch 28′ that is comprised of at least two follower arms that have aligned U-shaped followers 31 riding or skidding on their respective cam tracks. FIGURE 1 and FIGURE 4 illustrate the leading and lagging fall characteristics of the cam tracks of molded cam 15. The fall contour of cam tracks 20′ and 20‴ leads the fall contours of adjacent cam track 20″. The fall contours of adjacent cam track 20′ and of the adjacent cam track 20‴ are offset from the fall contour of cam track 20″ by a predetermined circumferential distance. The offset of the fall contours of cam track 20″ and cam tracks 20′ and 20‴ is in the direction of rotation of the moulded cam 15. The predetermined circumferential distance being proportional to the length of break time desired for the follower switch means to be in the "open" or disengaged position. Follower switch 28′ includes three follower arms 27′, 27″, and 27‴. Each of the three follower arms 27′, 27″ and 27‴ include a U-shaped follower 31 that rides an individual cam track of the first moulded cam means. The cam track which follower arm 27″ skids or slides, includes a fall contour that lags the fall contour of the adjacent cam tracks on which follower arms 27″ and 27‴ skids or slides. It is seen that follower arm 27″ will ride down its cooperatively associated rise contour after follower arm 27′ and follower arm 27‴ ride down their respective rise contours of their cooperatively associated cam tracks.

The follower arms 27′ and 27‴ include substantially the same components and are substantially the same in shape. The follower arms 27′ and 27‴ include a U-shaped follower 31 that rides or skids along the cooperatively associated lag circumferential track and a contact carrying blade 32. As disclosed hereinbefore, the follower arms are fabricated from any suitable electrically conductive, resilient metal that is gold flashed. The terminal end 33 of the contact carrying blade is fixedly coupled to a terminal block means 34. The terminal block means is fabricated from any suitable electrically non-conductive and durable material such as plastic or the like. The contacts 35 fixedly coupled to the contact carrying blade 32 underlie the contacts carried by follower arm 27″. Follower arm 27″ includes a substantially U-shaped follower extremity 31 and a T-shaped contact carrying blade 36. The U-shaped follower slides or skids down the cooperatively associated lag circumferential cam track only. The T-shaped contact carrying blade includes a contact 37 and a contact 37′. It is seen that contact 37 overlies the contact of follower arm 27′ and contact 37′ overlies the contact of follower arm 27‴. As U-shaped follower 31 of follower arms 27′ and 27‴ simultaneously fall down the lead contour, the contacts carried by the T-shaped blades of follower arms 27′ and 27‴ "open" or disengage the contacts carried by follower arm 27″. Thereafter, the U-shaped follower of follower arm 27″ simultaneously falls down the fall contour of the lag circumferential cam track cooperatively associated therewith so as to bias contacts 35 into engagement with or "closed" with the respective underlying contacts carried by follower arms 27′ and 27‴. It is seen that in the "closed" position, an electrically conductive path may be traced from follower arm 27′ through T-shaped follower arm 27″ and from follower arm 27‴ from T-shaped follower arm 27″.

Figure 5:
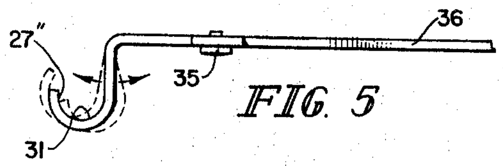
FIGURE 5 is a side view of a follower arm illustrating the means and method by which the follower arm may be adjusted on its cooperatively associated track.

FIGURE 5 illustrates the U-shaped follower 31 that is fabricated from the follower arm. As disclosed hereinbefore, the terminal end of the follower arm is fixedly coupled to the terminal block means so as to substantially prevent movement of the follower arm due to loose terminal block connection. In order to adjust the timing cycles of the moulded cam means 23, the U-shaped follower is manually displaced either away from or toward the moulded cam means 15 with an arcuate motion. The suggested arcuate displacements are illustrated by the dotted lines of FIGURE 5. It is seen that timing cycle adjustments of the U-shaped follower against the circumferential cam track are accomplished by manual, arcuate displacement of the U-shaped follower rather than by adjustment of the terminal end of the contact carrying blade with relation to the terminal block. The latter method has a tendency to make for loose terminal connections which effect the ability of the follower arm to ride on the cooperatively associated cam track whereas my method of adjustment of the follower arm does not have the tendency of loosening the terminal end of the follower arm in the terminal block means.

Another method of adjustment of the U-shaped followers may be accomplished by bending the ears or side extensions of the T-shaped cam follower 36, down or up, thereby providing perfect alignment of the U-shaped followers 27′, 27″ and 27‴ regardless of the timing cycle adjustment.

Figure 2:
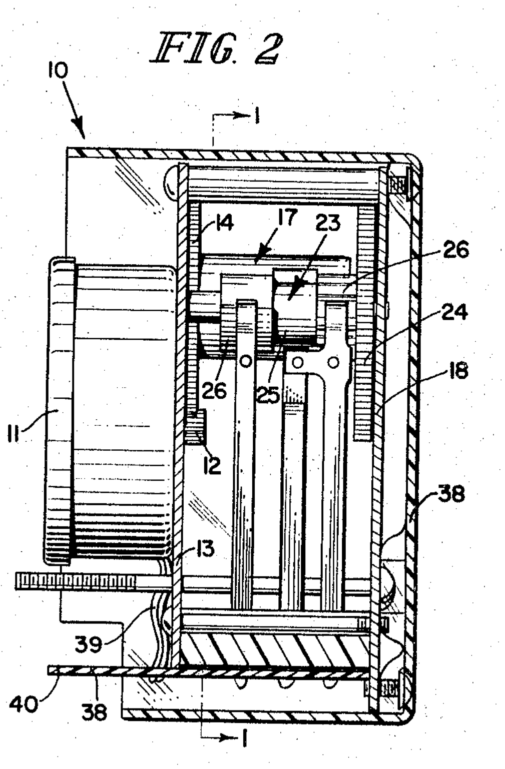
FIGURE 2 is a cross-sectional side view taken across the lines 3—3 of FIGURE 1 illustrating the aligned follower arms riding on the lead and lag fall and rise contours of the cam means.
Figure 3:
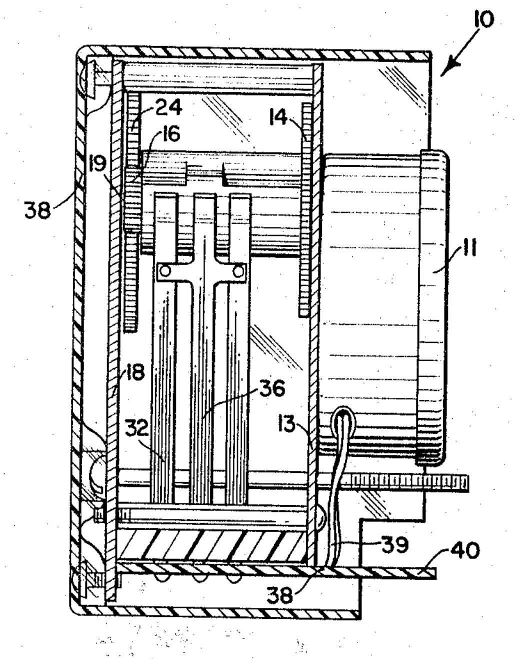
FIGURE 3 is a cross-sectional side view taken across the lines 2—2 of FIGURE 1 illustrating the plurality of aligned follower arms riding on the lead and lag contours of adjacent tracks of the cam means.

FIGURE 3 illustrates the means and methods whereby the miniature telephone interrupter switch means of the present invention is made substantially dust free. FIGURES 2 and 3 illustrate the means by which the follower switches are enclosed in a substantially dust free environment. The follower switches are located between mounting plate 13 and end plate 18. The third side of the follower switches is bounded by a terminal block 34. All sides of the follower switches except the side enclosed by mounting plate 13 are encapsulated by casing 38 fabricated from any durable and clear material such as clear plastic or the like. The terminal ends 33 of the follower arms, fixedly staked to the terminal block, engage with apertures (not shown) in printed circuit board 38. The apertures of the printed circuit board are electrically coupled to conductive channels (not shown) printed on the printed circuit board. A plurality of electrically conductive wires 39 electrically couple the drive means 11 to the printed circuit board without going through mounting plate 13 thereby eliminating an unnecessary aperture in the mounting plate and making the cavity containing the follower switches substantially dust free. The conductive channels (not shown) of the printed circuit board terminate at extremity 40. Extremity 40 mates with any of several commercially available receptacles. The commercially available receptacles are connected to an electrical source of energy.

Having described the structure of the present invention, the cooperation between the described structural elements will be disclosed.

The telephone interrupter switch means has the extremity 40 of the printed circuit board 38 in mating engagement with a present available cavity receptacle. Electrical energy flows from an electrical source (not shown) through the channels (not shown) on the printed circuit board to the drive means. In so doing, a plurality of electrical and mechanical functions are initiated. The drive means is activated by the flow of electrical energy therethrough so as to rotate pinion 12 in the counterclockwise direction. The pinion meshes with and drives speed reduction gear 14 at a constant speed in the clockwise direction. As disclosed hereinbefore, the speed reduction gear 14 is fixedly coupled to the first moulded cam 15. The moulded cam 15 is driven in the clockwise direction with the same rotational speed as is speed reduction gear 14. Small gear 16 is fixedly coupled to the first moulded cam 15 as shown in FIGURE 4. It is seen that the small gear is driven in the clockwise direction with the same rotational speed that the speed reduction gear 14 is driven. Small gear 16 meshes with and rotatably drives the second speed reduction gear 24 in the counterclockwise direction. The second speed reduction gear 24 is fixedly coupled to the second moulded cam 25 in the manner described hereinbefore. It is seen that both moulded cam 15 and moulded cam 25 rotate with a constant speed in predetermined directions. The rotational speed of the first moulded cam is proportional to the rotational rate of speed of pinion 12 and the diameter of the speed reduction gear 14 whereas the rotational speed of the second moulded cam is proportional to the aforementioned components plus the diameter of the second speed reduction gear 24. The rotational speed of either of the moulded cams may be varied by varying the aforementioned components.

With regard to the follower arms riding or skidding along the periphery of moulded cam 15, it is seen that as follower arms 27′ and 27‴ fall down the contour so its cooperatively associated circumferential cam track the follower arms 27′ and 27‴ and their contacts 35 are displaced outwardly and away from follower arms 27‴. The outward displacement of follower arms 27′ and 27‴ engages contacts 35 carried by follower arms 27′ and 27‴ from contacts 37 and 37′ carried by follower arm 27″. The disengagement of the aforementioned contacts interrupts the electrical circuit that was traced between follower arm 27′ and follower arm 27″ and between follower arm 27‴ and follower arm 27″. Any electrical current flowing through either one or both of these traced electrical circuits is interrupted by the "opening" or disengaging of the aforementioned contacts. The said contacts remain in the "open" or disengaged position for a predetermined length of time whereupon follower arm 27″ falls down its respective fall contour of its respective circumferential track. Since the fall contour of both of the tracks cooperatively associated with the follower arm 27′ and 27‴ are substantially the same, the contacts 35 of the said follower arms disengage contacts 37 and 37′ respectively at substantially the same instant of time that is, when the follower arms 27′ and 27‴ pass the apex of their respective fall contours. As disclosed hereinbefore, each circumferential cam track of cam 15 includes two fall contours and two rise contours in alternate relationship so that the hereinbefore traced electrical circuits are interrupted twice during each revolution of moulded cam 15.

As disclosed hereinbefore, moulded cam 25 rotates in the counterclockwise direction and includes one rise and one fall contour. The contact carrying blade 29, cooperatively associated with follower arm 27, does not ride on any of the circumferential cam tracks of moulded cam 25. When riding on the fall contour, the follower arm 27 is engaged with the contact of contact carrying blade 29. Upon engaging the rise contour of moulded cam 25, the engagement between the contact of the follower arm 27 and the contact of contact carrying blade 29 is broken thereby interrupting any current flowing between follower arm 27 and contact carrying blade 29. The contact is not closed until after the follower arm slides down the fall contour of the moulded cam 25. It is seen that the contacts of follower switch 28 are engaged for about one-half a revolution of moulded cam 25 and disengaged for about one-half a revolution of moulded cam 25.

While the invention is illustrated and described in its preferred embodiment, it will be understood that modifications and variations may be effected without departing from the scope of the novel concepts of this invention and as set forth in the appended claims.

Having thus describe my invention, I claim:

1. A miniature telephone interrupter switch means comprising: a cam means driven at a constant rate of speed, said cam means including arcuate circumferential tracks having substantially the same radius, said tracks including coded indicia contours; and a follower switch riding on adjacent tracks of said cam means, said follower switch including a first contact carrying follower arm having a U-shaped extremity riding on one of said tracks having lead coded indicia contours and a second contact carrying follower arm transversely spaced from said first follower arm having a U-shaped extremity riding on an adjacent track, said adjacent track including lag coded indicia contours offset a predetermined circumferential distance from said lead coded indicia contours, said contact of said second contact carrying follower arm underlying said contact of said first contact carrying follower arm, said contacts in a normally engaged position, said first follower arm riding on said cooperatively associated lead coded indicia contour causing disengagement of said contacts, thereafter said second follower arm riding on said cooperatively associated lag coded indicia contour to engage said contacts, said U-shaped extremities being arcuately displaceable relative to said cam tracks for adjusting the cyclic operation of said switch.

2. A miniature telephone interrupter switch means comprising: a drive means having a constant rotary motion output; a non-circular cam means coupled to and driven by said drive means, said non-circular cam means including a plurality of circumferential tracks in spaced parallel relationship, said tracks including rise and fall contours, said rise contours having an arc-shaped outline of a relatively large diameter, said fall contours having an arc-shaped outline of relatively small diameter; a second cam means coupled to and driven by said non-circular cam means, said second cam means including a plurality of circumferential tracks in spaced parallel relationship, said tracks including rise and fall contours; a gold flashed first follower switch riding on adjacent tracks of said non-circular cam means, said follower switch including a first contact carrying follower arm having an adjustable U-shaped extremity skidding on one of said tracks having a plurality of lead fall contours and a second contact carrying follower arm having an adjustable U-shaped extremity skidding on an adjacent track, said adjacent track including lag fall contours, said contact of said second contact carrying follower arm overlying said contact of said first contact of said first contact carrying follower arm said contacts in a normally engaged position, said first follower arm skidding down said cooperatively associated lead fall contour causing disengagement of said contacts, thereafter said second follower arm skidding down said cooperatively associated lag fall contour to engage said contacts; a second gold flashed follower switch skidding on said rise and fall contours of said second cam means, said second follower switch including a contact carrying follower arm including an adjustable U-shaped extremity and a contact carrying blade, said adjustable U-shaped extremity of follower arm skidding on said contours of said track, said follower arm biased into engagement with or disengagement with said contact carrying blade in accordance with said contours of said track; and a means encapsulating said interrupter switch means for maintaining said interrupter switch means substantially dust free.

3. A miniature telephone interrupter switch means comprising: a non-circular cam means driven at a constant rate of speed, said non-circular cam means including a plurality of circumferential tracks, said tracks including rise and fall contours, said rise contours having an arc-shaped outline of a relatively large diameter, said fall contours having an arc-shaped outline of relatively small diameter; a gold flashed first follower switch riding on adjacent tracks of said non-circular cam means, said follower switch including a first contact carrying follower arm having an adjustable U-shaped extremity skidding on one of said tracks having a plurality of lead fall contours and a second contact carrying follower arm having an adjustable U-shaped extremity skidding on an adjacent track, said adjacent track including lag fall contours, said U-shaped extremities of said follower means aligned on said non-circular cam means, said contact of said second contact carrying follower arm overlying said contact of said first contact of said first contact carrying follower arm said contacts in a normally engaged position, said first follower arm skidding down said cooperatively associated lead fall contour causing disengagement of said contacts, thereafter said second follower arm skidding down said cooperatively associated lag fall contour to engage said contacts; and a clear plastic means encapsulating said interrupter switch means for maintaining said interrupter switch means substantially dust free.

4. A miniature telephone interrupter switch means comprising: a drive means having a constant rotary motion output; a non-circular cam means coupled to and driven by said drive means, said non-circular cam means including a plurality of circumferential tracks in spaced parallel relationship, said tracks including rise and fall contours, said rise contours having an arc-shaped outline of a relatively large diameter, said fall contours having an arc-shaped outline of relatively small diameter; a second cam means coupled to and driven by said non-circular cam means, said second cam means including a plurality of circumferential tracks in spaced parallel relationship, said tracks including rise and fall contours; a gold flashed first follower switch riding on adjacent tracks of said non-circular cam means, said follower switch including a first contact carrying follower arm having an adjustable U-shaped extremity skidding on one of said tracks having a plurality of lead fall contours and a second contact carrying follower arm having an adjustable U-shaped extremity skidding on an adjacent track, said adjacent track including lag fall contours, said U-shaped extremities of said follower means aligned on said non-circular cam means, said contact of said second contact carrying follower arm overlying said contact of said first contact of said first contact carrying follower arm said contacts in a normally engaged position, said first follower arm skidding down said cooperatively associated lead fall contour causing disengagement of said contacts, thereafter said second follower arm skidding down said cooperatively associated lag fall contour to engage said contacts; a second gold flashed follower switch skidding on said rise and fall contours of said second cam means, said second follower switch including a contact carrying follower arm including an adjustable U-shaped extremity and a contact carrying blade, said adjustable U-shaped extremity of follower arm skidding on said contours of said track, said follower arm biased into engagement with or disengagement with said contact carrying blade in accordance with said contours of said track; and a clear plastic means encapsulating said interrupter switch means for maintaining said interrupter switch means substantially dust free.

5. A miniature telephone interrupter switch means comprising: a unitary cam means coupled driven at a constant rate of speed, said cam means including circumferential tracks having arcuate rise and fall contours, said tracks having substantially the same radius; and a follower switch riding on adjacent tracks of said first cam means, said follower switch including a first contact carrying follower arm having a U-shaped extremity riding on one of said tracks having lead arcuate fall contours and a second contact carrying follower arm transversely spaced from said first follower arm having a U-shaped extremity riding on an adjacent track, said adjacent track including lag arcuate fall contours offset a predetermined circumferential distance from said lead arcuate fall contours, said contact of said second contact carrying follower arm overlying said contact of said first contact carrying follower arm, said contacts in a normally engaged position, said first follower arm riding down said cooperatively associated lead fall contour causing disengagement of said contacts, thereafter said second follower arm riding down said cooperatively associated lag fall contour to engage said contacts, said U-shaped extremities being arcuately displaceable relative to said cam tracks for adjusting the cyclic operation of said switch; and means encapulating said interrupter switch means for maintaining said interrupter switch means substantially dust free.

6. A miniature telephone interrupter switch means comprising: a unitary cam means coupled driven at a constant rate of speed, said cam means including circumferential tracks having arcuate rise and fall contours, said tracks having substantially the same radius; and a follower switch riding on adjacent tracks of said first cam means, said follower switch including a first contact carrying follower arm having a U-shaped extremity riding on one of said tracks having lead arcuate fall contours and a second contact carrying follower arm transversely spaced from said first follower arm having a U-shaped extremity riding on an adjacent track, said adjacent track including lag arcuate fall contours offset a predetermined circumferential distance from said lead acurate fall contours, said contact of said second contact carrying follower arm overlying said contact of said first contact carrying follower arm, said contacts in a normally engaged position, said first follower arm riding down said cooperatively associated lead fall contour causing disengagement of said contacts 5 thereafter said second follower arm riding down said cooperatively associated lag fall contour to engage said contacts, said U-shaped extremities being arcuately displaceable relative to said cam tracks for adjusting the cyclic operation of said switch; and printed circuit board means having electrically conductive paths connected to said follower arms providing readily accessible external terminal contacts.

7. A miniature telephone interrupter switch means comprising: a unitary cam means coupled driven at a constant rate of speed, said cam means including circumferential tracks having arcuate rise and fall contours, said tracks having substantially the same radius; a follower switch riding on adjacent tracks of said first cam means, said follower switch including a first contact carrying follower arm having a U-shaped extremity riding on one of said tracks having lead arcuate fall contours and a second contact carrying follower arm transversely spaced from said first follower arm having a U-shaped extremity riding on an adjacent track, said adjacent track including lag arcuate fall contours offset a predetermined circumferential distance from said lead arcuate fall contours, said contact of said second contact carrying follower arm overlying said contact of said first contact carrying follower arm, said contacts in a normally engaged position, said first follower arm riding down said cooperatively associated lead fall contour causing disengagement of said contacts, thereafter said second follower arm riding down said cooperatively associated lag fall contour to engage said contacts said U-shaped extremities being arcuately displaceable relative to said cam tracks for adjusting the cyclic operation of said switch; means encapsulating said interrupter switch means for maintaining said interrupter switch means substantially dust free; and printed circuit board means having electrically conductive paths connected to said follower arms providing readily accessible terminal contact externally of said encapsulating means.

8. A miniature telephone interrupter switch means comprising: a unitary cam means coupled driven at a constant rate of speed, said cam means including circumferential tracks having arcuate rise and fall contours, said tracks having substantially the same radius; and a follower switch riding on adjacent tracks of said first cam means, said follower switch including a first contact carrying follower arm having a U-shaped extremity skidding on one of said tracks having lead arcuate fall contours and a second contact carrying follower arm transversely spaced from said first follower arm having a U-shaped extremity skidding on an adjacent track, said adjacent track including lag arcuate fall contours offset a predetermined circumferential distance from said lead arcuate fall contours, said U-shaped extremities of said follower arms arcuately displaceable so as to adjust contact spacing between said contacts carried by said arms, said contact of said second contact carrying follower arm overlying said contact of said first contact carrying follower arm, said contacts in a normally engaged position, said first follower arm skidding down said cooperatively associated lead fall contour causing disengagement of said contacts, thereafter said second follower arm skidding down said cooperatively associated lag fall contour to engage said contacts, said U-shaped extremities being arcuately displaceable relative to said cam tracks for adjusting the cyclic operation of said switch; means encapsulating said interrupter switch means for maintaining said interrupter switch means substantially dust free; and printed circuit board means having electrically conductive paths connected to said follower arms providing readily accessible terminal contact externally of said encapsulating means.

9. A miniature telephone interrupter switch means comprising: a non-circular cam means driven at a constant rate of speed, said non-circular cam means including a plurality of circumferential tracks having arcuate rise and fall contours, said tracks having substantially the same radius, said rise contours having an arc-shaped outline of a relatively large diameter, said fall contours having an arc-shaped outline of relatively small diameter; first follower switch riding on adjacent tracks of said non-circular cam means, said follower switch including a first contact carrying follower arm having a U-shaped extremity riding on one of said tracks having a plurality of lead fall contours and a second contact carrying follower arm transversely spaced from said first follower arm having a U-shaped extremity riding on an adjacent track, said adjacent track including lag fall contours offset a predetermined circumferential distance from said lead fall contours, said U-shaped extremities of said follower arms arcuately displaceable so as to adjust contact spacing between contacts carried by said arms, said contact of said second contact carrying follower arm overlying said contact of said first contact carrying follower arm said contacts in a normally engaged position, said first follower arm riding down said cooperatively associated lead fall contour causing disengagement of said contacts, thereafter said second follower arm riding down said cooperatively associated lag fall contour to engage said contacts; and printed circuit board means having electrically conductive paths connected to said follower arms providing readily accessible external contact.

10. A miniature telephone interrupter switch means comprising: a non-circular cam means driven at a constant rate of speed, said non-circular cam means including a plurality of circumferential tracks having arcuate rise and fall contours, said tracks having substantially the same radius, said rise contours having an arc-shaped outline of a relatively large diameter, said fall contours having an arc-shaped outline of relatively small diameter; a follower switch riding on adjacent tracks of said non-circular cam means, said follower switch including a first contact carrying follower arm having a U-shaped extremity skidding on one of said tracks having a plurality of lead fall contours and a second contact carrying follower arm having a U-shaped extremity riding on an adjacent track, said adjacent track including lag fall contours offset a predetermined circumferential distance from said lead fall contours, said U-shaped extremities of said follower arms arcuately displaceable so as to adjust contact spacing between said contacts carried by said arms, said contact of said second contact carrying follower arm overlying said contact of said first contact carrying follower arm, said contacts in a normally engaged position, said first follower arm riding down said cooperatively associated lead fall contour causing disengagement of said contacts, thereafter said second follower arm riding down said cooperatively associated lag fall contour to engage said contacts; a clear plastic means encapsulating said interrupter switch means for maintaining said interrupter switch means substantially dust free; and printed circuit board means having electrically conductive paths connected to said follower arms providing readily accesible terminal contact externally of said encapsulating means.

11. A miniature telephone interrupter switch means comprising: a non-circular cam means driven at a constant rate of speed, said non-circular cam means including a plurality of circumferential tracks having arcuate rise and fall contours, said tracks having substantially the same radius, said rise contours having an arc-shaped outline of a relatively large diameter, said fall contours having an arc-shaped outline of relatively small diameter; a follower switch riding on adjacent tracks of said non-circular cam means, said follower switch including first and escond contact carrying follower arms having U-shaped extremities riding on said tracks having a plurality of lead fall contours and a T-shaped contact carrying follower blade having an adjustable U-shaped extremity riding on a track adjacent said tracks, said first and second follower arms are skidding, said adjacent track including lag fall contours offset a predetermined circumferential distance from said lead fall contours, said U-shaped extremities of said follower arms and said blade arcuately displaceable so as to adjust contact spacing between said contacts carried by said arms and said blade, said contacts of said T-shaped contact carrying blade overlying said contacts of said first and second contact carrying follower arms, said first and second follower arms riding down said cooperatively associated lead fall contour in a determined sequence causing disengagement of said contacts, thereafter said T-shaped blade riding down said cooperatively associated lag fall contour to engage said contacts; and printed circuit board means having electrically conductive paths connected to said follower arms providing readily accessible external terminal contact means.

12. A miniature telephone interrupter switch means comprising: a non-circular cam means driven at a constant rate of speed, said non-circular cam means including a plurality of circumferential tracks having arcuate rise and fall contours, said tracks having substantially the same radius, said rise contours having an arc-shaped outline of a relatively large diameter, said fall contours having an arc-shaped outline of relatively small diameter; a follower switch riding on adjacent tracks of said non-circular cam means, said follower switch including first and second contact carrying follower arms having U-shaped extremities skidding on said tracks having a plurality of lead fall contours and a T-shaped contact carrying follower blade having a U-shaped extremity skidding on a track adjacent said tracks, said first and second follower arms are skidding, said adjacent track including lag fall contours offset a predetermined circumferential distance from said lead fall contours, said U-shaped extremities of said follower arms and said blade arcuately displaceable so as to adjust contact spacing between said contacts carried by said arms and said blade, said contacts of said T-shaped contact carrying blade overlying said contacts of said first and second contact carrying follower arms, said first and second follower arms skidding down said cooperatively associated lead fall contour in a determined sequence causing disengagement of said contacts, thereafter said T-shaped blade skidding down said cooperatively associated lag fall contour to engage said contacts; a clear plastic means encapsulating said interrupter switch means for maintaining said interrupter switch means substantially dust free; and printed circuit board means having electrically conductive paths connected to said follower arms providing readily accessible terminal contact externally of said encapsulating means.

(References on following page)

References Cited by the Examiner

UNITED STATES PATENTS

| | | | |
|---|---|---|---|
| 1,347,391 | 7/1920 | Lorking | 200—170 |
| 1,475,819 | 11/1923 | Hartman | 200—27 |
| 1,563,488 | 12/1925 | Hoge | 200—27 |
| 2,610,239 | 9/1952 | Shepherd | 200—27 |
| 3,953,667 | 9/1960 | Kavanaugh | 200—166.1 |
| 3,249,728 | 7/1963 | Sasamoto et al. | 200—166 |
| 3,106,620 | 10/1963 | Haydon | 200—38 |
| 3,283,107 | 11/1966 | Anson | 335—114 |

FOREIGN PATENTS

| | | |
|---|---|---|
| 929,312 | 6/1955 | Germany. |

BERNARD A. GILHEANY, *Primary Examiner.*

H. E. SPRINGBORN, *Assistant Examiner.*